US009039383B2

(12) United States Patent
Okamoto

(10) Patent No.: US 9,039,383 B2
(45) Date of Patent: May 26, 2015

(54) CONTROL APPARATUS FOR ELECTRIC OIL PUMP

(75) Inventor: Naoki Okamoto, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 214 days.

(21) Appl. No.: 13/610,216

(22) Filed: Sep. 11, 2012

(65) Prior Publication Data

US 2013/0078111 A1    Mar. 28, 2013

(30) Foreign Application Priority Data

Sep. 22, 2011   (JP) .................. 2011-206739

(51) Int. Cl.
| F04B 49/10 | (2006.01) |
| F04B 49/02 | (2006.01) |
| F04B 49/06 | (2006.01) |
| F16H 61/00 | (2006.01) |
| F16H 59/72 | (2006.01) |
| F16H 61/12 | (2010.01) |

(52) U.S. Cl.
CPC ............... F04B 49/02 (2013.01); F04B 49/06 (2013.01); F04B 2205/10 (2013.01); F04B 2205/11 (2013.01); F16H 59/72 (2013.01); F16H 2061/1208 (2013.01); F16H 2312/14 (2013.01); F16H 61/0031 (2013.01)

(58) Field of Classification Search
CPC ............. F04B 2205/10; F04B 2205/11; F04B 2201/0402; F04C 2210/14; F04C 2210/19; F04C 2270/225; F04D 15/0094; F04D 15/00
USPC ......... 417/13, 14, 32, 281, 364, 426; 475/137
See application file for complete search history.

(56) References Cited

U.S. PATENT DOCUMENTS

| 3,463,384 | A | * | 8/1969 | Kilbane ............................ 418/2 |
| 4,531,485 | A | * | 7/1985 | Murther ..................... 123/196 S |
| 5,782,616 | A | * | 7/1998 | Yoo ................................ 417/364 |
| 6,082,971 | A | * | 7/2000 | Gunn et al. ..................... 417/32 |
| 6,107,794 | A | * | 8/2000 | Kipp et al. ................. 324/207.23 |
| 6,309,193 | B1 | * | 10/2001 | Repple et al. ............. 417/423.8 |
| 6,499,963 | B2 | * | 12/2002 | Repple et al. ................. 417/292 |
| 7,581,449 | B2 | * | 9/2009 | Miller ............................. 73/744 |
| 7,614,381 | B2 | * | 11/2009 | Hoff et al. ................. 123/196 R |

(Continued)

FOREIGN PATENT DOCUMENTS

| EP | 2 282 083 A1 | 2/2011 |
| JP | 2005-214216 A | 8/2005 |

(Continued)

*Primary Examiner* — Alexander Comley
(74) *Attorney, Agent, or Firm* — Foley & Lardner LLP

(57) ABSTRACT

A temperature range in which an electric oil pump to supply oil to a vehicle drive system can start is enlarged to enhance an effective use degree, enhance a start success probability, and suppress malfunction occurrence. When a measured oil temperature To is in a temperature range ($T1 \leq To < T2$) in which it is not clear whether or not the electric oil pump normally operates, a trial operation is performed with a drive current limited as compared with a regular operation and a target rotation number No while malfunction determination is invalid (a non-established state) (S1→S6), when a rotation number which is not smaller than predetermined rotation number No cannot be achieved, pump driving is stopped (S9, 14), and when the rotation number is achieved, the malfunction determination is allowed (S11), and the pump is driven according to an instruction (S12).

9 Claims, 13 Drawing Sheets

(56) References Cited

U.S. PATENT DOCUMENTS

| | | |
|---|---|---|
| 7,909,582 B2 * | 3/2011 | Kumazaki et al. ............... 417/2 |
| 8,046,126 B2 | 10/2011 | Yanagida et al. |
| 2002/0107103 A1 * | 8/2002 | Nakamori et al. ............ 475/116 |
| 2003/0005751 A1 | 1/2003 | Berndorfer et al. |
| 2003/0109970 A1 * | 6/2003 | Nakamori et al. ............ 701/22 |
| 2003/0148850 A1 * | 8/2003 | Tomohiro et al. ................ 477/3 |
| 2003/0197385 A1 * | 10/2003 | Onoyama et al. ........... 290/40 R |
| 2004/0029677 A1 * | 2/2004 | Mori et al. ........................ 477/3 |
| 2004/0217180 A1 * | 11/2004 | Lu ............................... 236/44 C |
| 2005/0106040 A1 * | 5/2005 | Repple et al. ................. 417/313 |
| 2008/0109129 A1 | 5/2008 | Yanagida et al. |
| 2009/0232673 A1 * | 9/2009 | Reisch et al. ................. 417/364 |
| 2011/0077828 A1 * | 3/2011 | Matsuda et al. ................. 701/54 |
| 2011/0084638 A1 * | 4/2011 | Patel et al. ............... 318/400.32 |

FOREIGN PATENT DOCUMENTS

| | | |
|---|---|---|
| JP | 2006-254616 A | 9/2006 |
| JP | 2009-052638 A | 3/2009 |
| JP | 2009-185915 A | 8/2009 |
| JP | 2011-000978 A | 1/2011 |
| WO | WO 2009/147982 | * 10/2009 |

* cited by examiner

CONTROL APPARATUS FOR ELECTRIC OIL PUMP

BACKGROUND OF THE INVENTION

1. Field of the Invention

The present invention relates to a control apparatus for an electric oil pump that supplies oil to a drive system of a vehicle, for the generation of hydraulic pressure in a transmission of an idling stopped car, for the cooling of a running electric motor, or for an inverter of a hybrid car, or the like.

2. Description of Related Art

In this type of electric oil pump, when a temperature of oil (the oil temperature) is a very low temperature, viscosity significantly increases, the number of rotations of a pump driving electric motor is insufficient, and a preferable amount of the oil (the hydraulic pressure) cannot be discharged. To solve this problem, it has been considered for the oil temperature to operate the electric oil pump be set. However, there may be measurement errors due to fluctuations in characteristics of an oil temperature sensor, or the like. Therefore, even at an oil temperature at which the electric oil pump can actually be operated, the electric oil pump sometimes cannot be operated.

As a consequence, a temperature range in which the electric oil pump can be operated is narrowed, and control cannot be sufficiently exerted.

In technology disclosed in Japanese Laid-Open Patent Publication No. 2006-254616 as Patent Document 1, at the malfunction of the start of the electric oil pump, it is determined whether or not the electric oil pump is malfunctioning according to the outside air temperature in consideration of the influence of the oil viscosity, to prevent the occurrence of incorrect diagnosis.

However, also in Patent Document 1, it is not possible to expand the temperature range in which the electric oil pump can be operated. Moreover, the electric oil pump cannot be operated until the pump needs to be actually started. Therefore, at the malfunction of the start of the pump, the hydraulic pressure, flow rate or the like by the electric oil pump cannot be obtained, which has a large influence on a vehicle.

SUMMARY OF THE INVENTION

The present invention has been developed in view of such a conventional problem, and an object thereof is to provide a control apparatus of an electric oil pump which enlarges a temperature range in which the electric oil pump can be started, so that it is possible to enhance an effective use degree and to enhance a start success probability.

To achieve the above object, a control apparatus of an electric oil pump which supplies oil to a vehicle drive system according to an aspect of the present invention includes: an oil temperature measuring section which measures an oil temperature; a trial operation control section which performs a trial operation in a state in which malfunction determination of the electric oil pump is not established, when the measured oil temperature is in a temperature range in which it is not clear whether or not the electric oil pump normally operates in consideration of a measurement error; and a regular operation allowing determining section which determines whether or not to allow a regular operation of the electric oil pump based on a drive state of the electric oil pump subjected to the trial operation.

Moreover, a control method for an electric oil pump which supplies oil to a vehicle drive system according to an aspect of the present invention includes the steps of: measuring an oil temperature; performing a trial operation in a state in which malfunction determination of the electric oil pump is not established, when the measured oil temperature is in a temperature range in which it is not clear whether or not the electric oil pump normally operates in consideration of a measurement error; and determining whether or not to allow a regular operation of the electric oil pump based on a drive state of the electric oil pump subjected to the trial operation.

DESCRIPTION OF PREFERRED EMBODIMENTS

Hereinafter, there will be described an embodiment in which the present invention is applied to generation of hydraulic pressure in a transmission of an idled stopped car.

Figure 1:
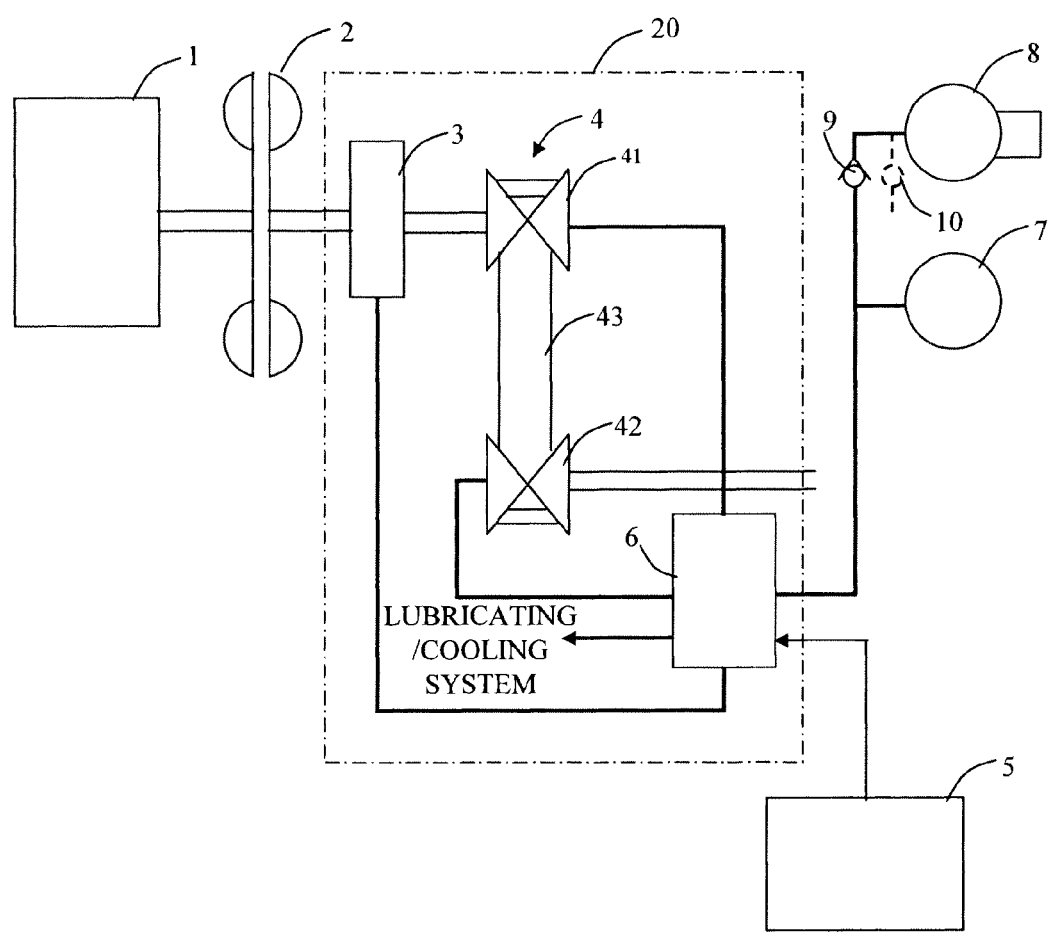
FIG. 1 is a view of a drive force transmission system of a vehicle including a control apparatus for an electric oil pump according to an embodiment.

In FIG. 1, an engine (an internal combustion engine) 1 is connected to a continuously variable transmission 4 via a torque converter 2 and a forward/backward switch mechanism 3 which is a starting clutch mechanism.

Forward/backward switch mechanism 3 includes, for example, a planetary gear mechanism constituted of a ring gear, a pinion and a pinion carrier coupled to an engine output shaft, and a sun gear coupled to a transmission input shaft; a backing brake which fixes a transmission case to the pinion carrier; and an advancing clutch which couples the transmission input shaft to the pinion carrier, to switch the advancing and backing of a vehicle. The backing brake and the advancing clutch are switched by switching fastening by use of a hydraulic pressure of an operating oil (the oil) which is commonly used for continuously variable transmission 4.

Continuously variable transmission 4 includes a primary pulley 41, a secondary pulley 42, and a V-belt 43 disposed between these pulleys, rotation of primary pulley 41 is transmitted to secondary pulley 42 via V-belt 43, and rotation of secondary pulley 42 is transmitted to driving wheels, to run and drive the vehicle.

While the above drive force is transmitted, a movable conical plate of primary pulley 41 and a movable conical plate of secondary pulley 42 are moved in an axial direction to change a radius of a position of contact with V-belt 43, whereby a rotation ratio, i.e., a speed change ratio between primary pulley 41 and secondary pulley 42 can be changed.

Control of a transmission mechanism 20 including forward/backward switch mechanism 3 and continuously variable transmission 4 is performed as follows.

CVT control unit 5 calculates a speed change control signal based on various signals of the vehicle, and a pressure regulation mechanism 6, into which the speed change control signal has been input, regulates a discharge pressure from an engine driven mechanical oil pump 7 for each part of transmission mechanism 20, to supply the oil to the respective parts, thereby performing the control.

On the other hand, an electric oil pump 8 is disposed in a path which bypasses mechanical oil pump 7. Electric oil pump 8 is driven according to a control signal from CVT control unit 5, to alleviate fastening shock at restart after idle stop of the vehicle.

That is, when the vehicle temporarily stops, idle stop control is started, electric oil pump 8 is driven to supply the operating oil to each part of transmission mechanism 20. In consequence, after maintaining the hydraulic pressure of the advancing clutch of forward/backward switch mechanism 3 at a restarting hydraulic pressure or a higher pressure, engine stop is allowed, to stop an idle operation.

Additionally, in an oil path at an outlet of electric oil pump 8, a check valve 9 to prevent the counterflow of the oil at a usual time is disposed. Moreover, as illustrated by a dotted line in FIG. 1, a relief valve 10 which opens at a predetermined pressure or a lower pressure may be disposed to limit the discharge pressure from electric oil pump 8 to a pressure which is not greater than the predetermined pressure.

Figure 2:
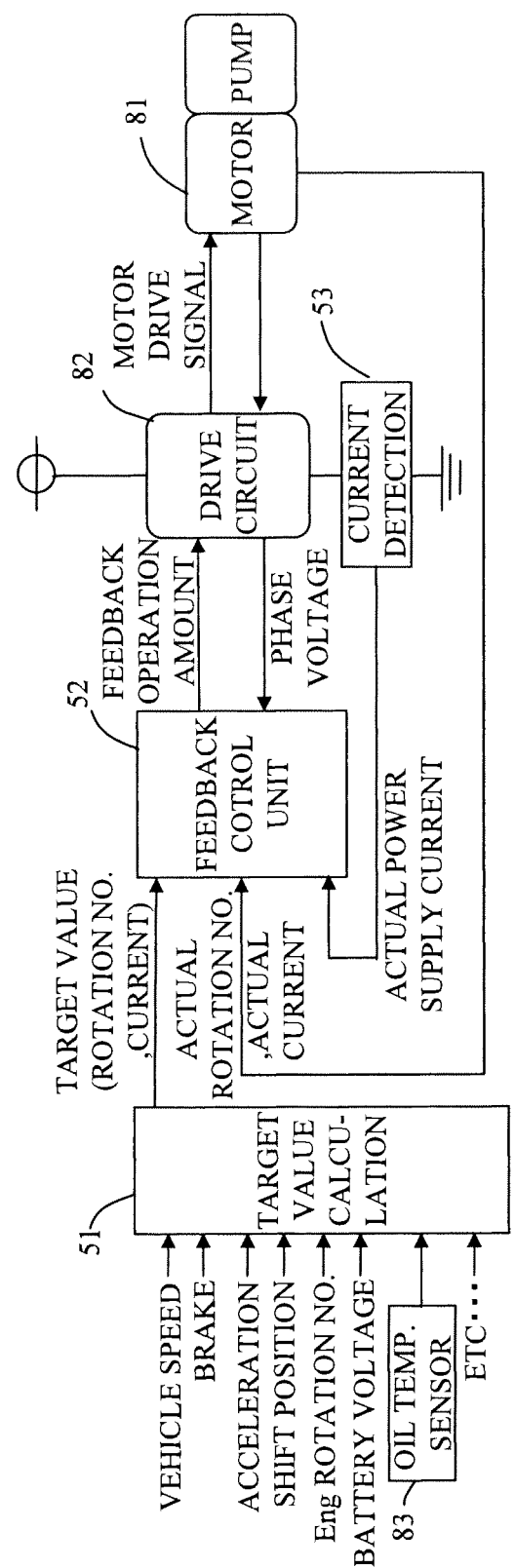
FIG. 2 is a control block diagram of the control apparatus for the electric oil pump.

FIG. 2 illustrates a control system block diagram of the hydraulic pressure control for the restart.

A target value calculating section 51 inputs detection signals from various sensors of the vehicle (the vehicle speed, brake, acceleration, shift position, engine rotation speed, battery voltage, etc.), and calculates a target value of a rotation number (or the motor current) of a motor 81 which drives electric oil pump 8, according to a vehicle operation state detected based on these signals.

A feedback control unit 52 inputs the target value (the target motor rotation number or the target motor current) from target value calculating section 51, and also inputs an actual rotation number or an actual motor current of motor 81 which is a control amount, and an actual power supply current Ib of a drive circuit 82 of motor 81. Power supply current Ib is detected by a current sensor 53. The actual rotation number of motor 81 is directly measured by the sensor, or can be detected by inputting a phase voltage of the motor from drive circuit 82.

Moreover, the actual rotation number of motor 81 is controlled by outputting a feedback operation amount calculated by using PID control or the like, so as to bring the rotation number close to the target rotation number. The operation amount is, for example, a pulse width (the duty ratio) in the case of pulse width modulation (PWM) control.

Furthermore, for the control of electric oil pump 8 at the start described later, there is disposed an oil temperature sensor 83 which measures the temperature of the oil (the oil temperature), and a measured oil temperature signal is output to target value calculating section 51.

In such a constitution, the control of the electric oil pump at the start is performed as follows.

Figure 3:
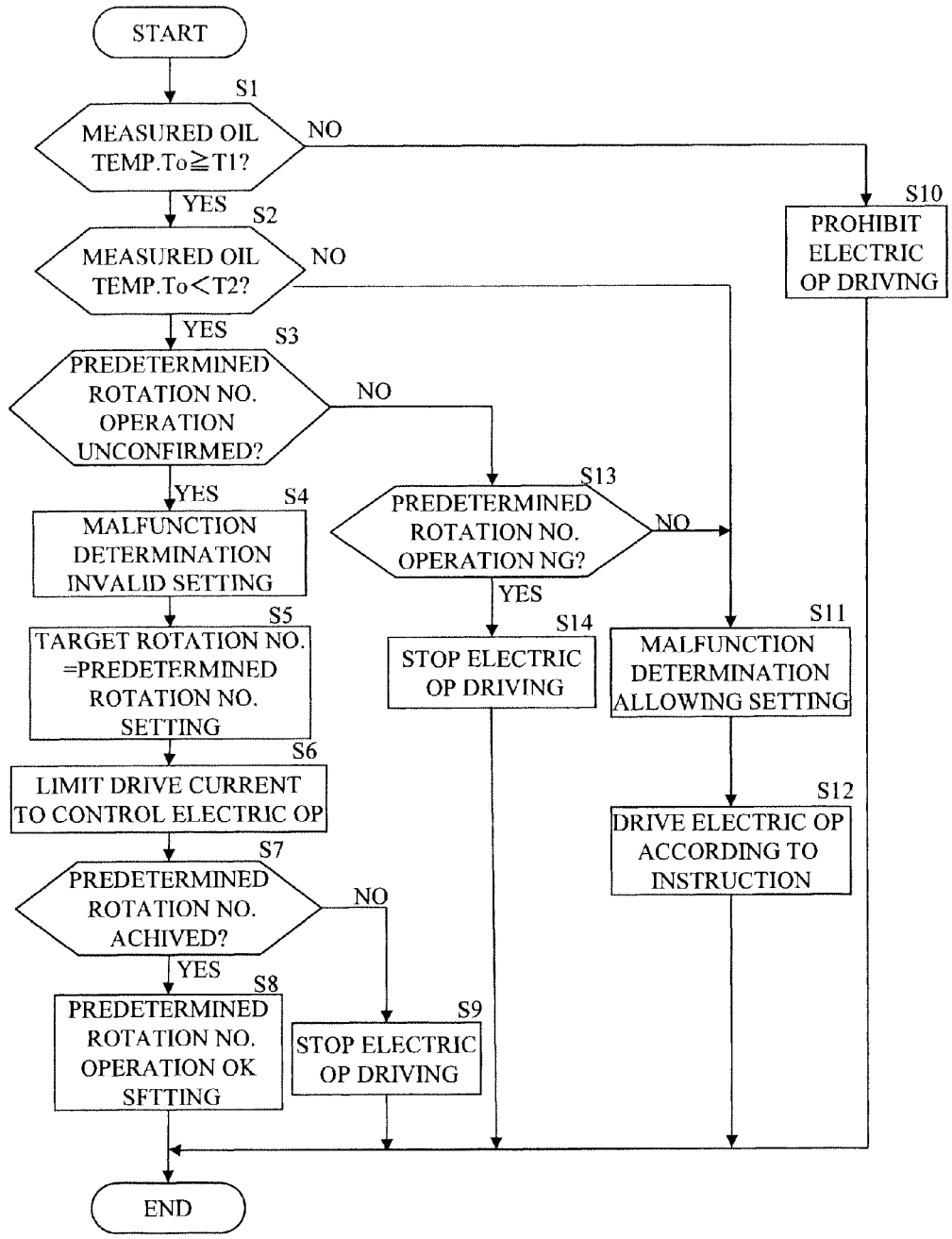
FIG. 3 is a flowchart of power supply current control for an electric oil pump according to a first embodiment.

FIG. 3 is a flowchart of a first embodiment.

In a step 1, it is determined whether an oil temperature To measured by oil temperature sensor 83 is not lower than a first temperature T1. Here, first temperature T1 is set in consideration of a measurement error due to a fluctuation of oil temperature sensor 83 or the like. For example, when an actual oil temperature $t_o$ is not lower than a predetermined value t0, an oil viscosity is kept at a value which is not larger than a predetermined value, and the driving of electric oil pump 8 is assured. In this case, the temperature is the set temperature for a case in which actual oil temperature $t_o$ has a maximum error to measured oil temperature To of oil temperature sensor 83 on a high temperature side (the positive side).

When it is determined in step 1 that measured temperature To is lower than first temperature T1, (even when actual oil temperature $t_o$ of oil temperature sensor 83 has the maximum error on the high temperature side) the actual oil temperature $t_o$ is lower than operation assuring oil temperature t0. Therefore, even when electric oil pump 8 is normal, it is judged that the operation is not assured, and the step proceeds to a step 10 to prohibit the driving of electric oil pump 8.

Moreover, when it is determined that measured temperature To is not lower than first temperature T1, the step proceeds to a step 2 to determine whether measured oil temperature To is lower than second temperature T2. Here, second temperature T2 is the set temperature for a case in which actual oil temperature $t_o$ has a maximum error to measured oil temperature To on a low temperature side (the negative side).

When it is determined in step 2 that measured oil temperature To is not lower than second temperature T2, (even when actual oil temperature $t_o$ of oil temperature sensor 83 has the maximum error on the low temperature side), the actual oil temperature $t_o$ is not lower than operation assuring oil temperature t0. When electric oil pump 8 is normal, the operation of the pump is assured. Therefore, it is judged that malfunction determination of electric oil pump 8 is possible. That is, when electric oil pump 8 is normal, control is performed as instructed, and when the pump fails to operate properly, the control is not performed as instructed, and hence the malfunction determination is possible.

Therefore, in this case, the step proceeds to step 11 to set the malfunction determination to be allowed, and in step 12, electric oil pump 8 is driven according to the instruction. Moreover, according to the malfunction determination, when the control is not performed as instructed, the malfunction determination of another battery voltage, oil temperature sensor 83 or another drive circuit is performed. Additionally, when these parts are normal, it is determined that electric oil pump 8 fails to operate property.

When it is determined in step 2 that measured oil temperature To is lower than second temperature T2, i.e., when it is determined that measured oil temperature To is in a range of T1≤To<T2, owing to the measurement error due to the fluctuation of oil temperature sensor 83 or the like, it cannot be determined whether actual oil temperature $t_o$ is not lower than operation assuring temperature t0. In this case, the step proceeds to a step 3 and the subsequent step, to forcibly drive electric oil pump 8 (the trial operation) while limiting the driving.

In step 3, by the trial operation of electric oil pump 8 described later, it is determined whether it is determined (confirmed) or not (unconfirmed) that a predetermined rotation number No has been reached.

When it is determined to be unconfirmed, the step proceeds to a step 4 to set the malfunction determination of electric oil pump 8 to be invalid (the malfunction determination is not established).

Next, in a step 5, the target rotation number of electric oil pump 8 is set to predetermined rotation number No.

Here, predetermined rotation number No is set to a rotation number which can be achieved when actual oil temperature $t_o$ is operation assuring temperature t0, for example, in a case in which electric oil pump 8 is driven with the limited drive current, or set to a slightly lower rotation number (a lower speed value than the target rotation number set at a regular operation). Therefore, when electric oil pump 8 reaches predetermined rotation number No by the control to set predetermined rotation number No to the target rotation number, it can be presumed that actual oil temperature $t_o$ is acquired at operation assuring temperature t0 or higher.

In a step 6, electric oil pump 8 is driven while limiting the drive current, and the control is performed to set predetermined rotation number No to the target rotation number.

In a step 7, it is determined whether or not the rotation number of electric oil pump 8 can reach predetermined rotation number No.

Then, when it is possible to reach predetermined rotation number No, the step proceeds to a step 8 to obtain predetermined rotation number operation OK setting.

When the rotation number cannot reach predetermined rotation number No, a normal operation of electric oil pump 8 is not assured, and hence the step proceeds to a step 9 to stop the driving of electric oil pump 8.

After such a trial operation of electric oil pump 8, in the next flow, the step proceeds from step 3 to a step 13 to determine whether or not the operation at predetermined rotation number No is achieved. When it is determined that the operation cannot be achieved, it is judged that the operation of electric oil pump 8 is not assured (the operation defect), and the step proceeds to a step 14 to stop the driving of electric oil pump 8. However, it cannot be determined whether the operation defect of electric oil pump 8 is caused by the malfunction of electric oil pump 8 or by actual oil temperature $t_o$ which is excessively low, and hence the invalid setting of the malfunction determination is maintained whereas the malfunction determination is not established.

On the other hand, when it is determined in step 13 that the predetermined rotation number No operation can be achieved, it is presumed that actual oil temperature $t_o$ is operation assuring temperature t0 or higher, in step 11, the malfunction determination allowing setting is performed, and in step 12, electric oil pump 8 is driven according to the instruction.

Figure 4:
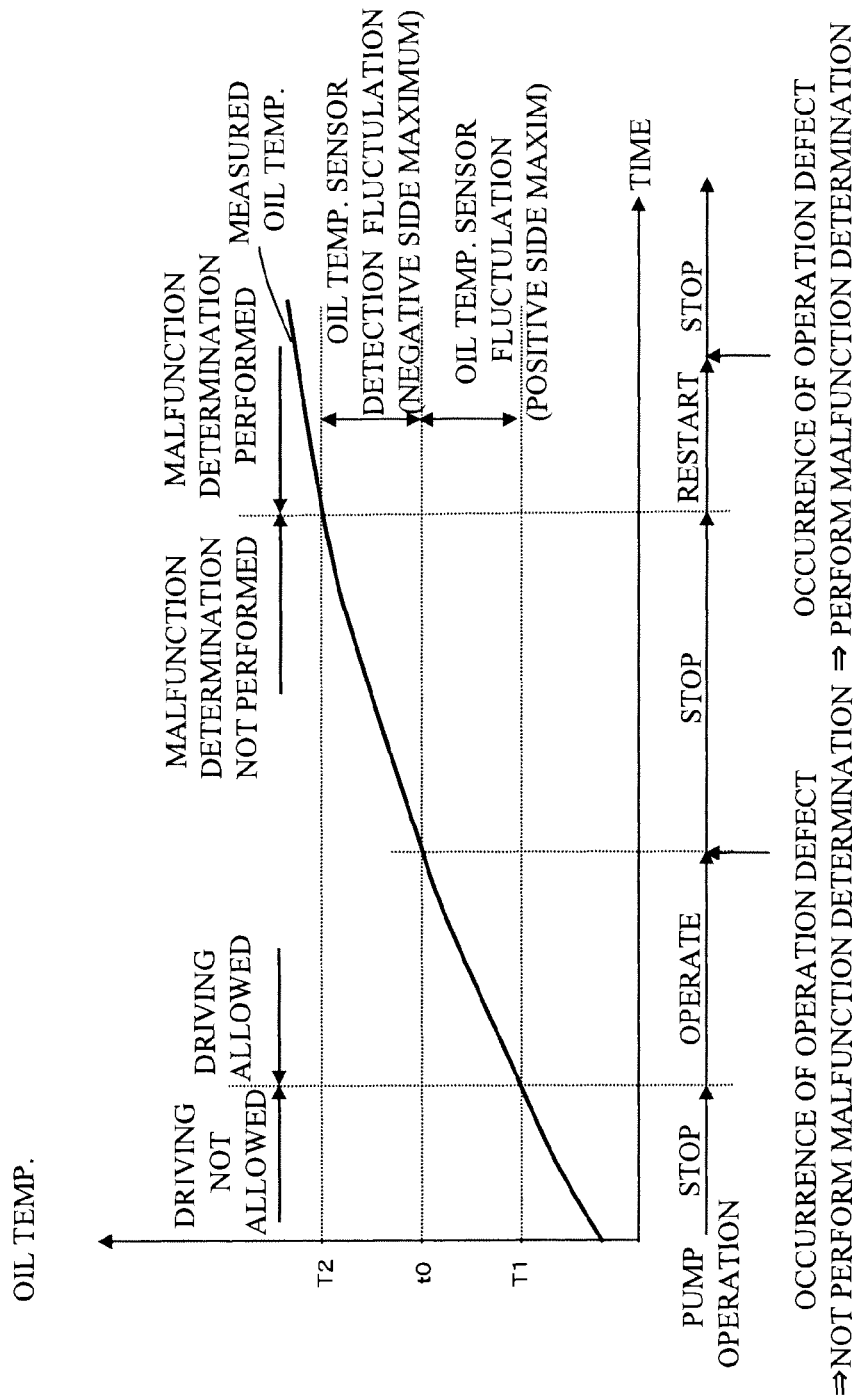
FIG. 4 is a diagram of a relationship between an oil temperature and an operation state in control at the start of the electric oil pump.

FIG. 4 illustrates a relationship between the oil temperature and an operation state in the control at the start of electric oil pump 8.

According to such control, when it is determined, based on the measured value of the oil temperature in consideration of the measurement error of oil temperature sensor 83 (the measured oil temperature), that actual oil temperature $t_o$ is lower than operation assuring oil temperature t0 of electric oil pump 8 and the operation of electric oil pump 8 is not assured, the driving of electric oil pump 8 is prohibited. In consequence, it is possible to suppress the occurrence of a circuit malfunction or the like due to the supply of an excessively large power to electric oil pump 8.

Moreover, when it is determined based on the measured oil temperature To that actual oil temperature $t_o$ is higher than operation assuring oil temperature t0 of electric oil pump 8 and the operation of electric oil pump 8 is assured, usual control of electric oil pump 8 is started, and the hydraulic pressure is raised to alleviate the shock at the clutch fastening, so that the malfunction determination can be allowed.

On the other hand, when measured oil temperature To is in a temperature range in which it is not clear whether or not the operation of electric oil pump 8 is assured, electric oil pump 8 is controlled, while the drive current is limited and limited predetermined rotation number No is the target rotation number (the trial operation). When it is judged whether or not predetermined rotation number No can be achieved, it can be presumed whether actual oil temperature $t_o$ is not lower than operation assuring oil temperature t0.

Moreover, when it is presumed that actual oil temperature $t_o$ is not lower than operation assuring oil temperature t0, the malfunction determination of the electric oil pump is allowed, and the usual control (the regular operation) according to the instruction is performed, so that the shock at the restart can be alleviated. That is, it is possible to allow the malfunction determination and start the usual control immediately without waiting until measured oil temperature To becomes second temperature T2 or higher. In this way, the operation start enabling temperature of the electric oil pump can be extended to the low temperature side.

Furthermore, when it is presumed that actual oil temperature $t_o$ is lower than operation assuring oil temperature t0, it is possible to prohibit the driving of electric oil pump 8 and suppress the occurrence of the circuit malfunction due to the supply of the excessively large power. Here, prior to such presuming, electric oil pump 8 is driven, but there is performed the trial operation in which the drive current and the target rotation number are limited. Therefore, it is possible to avoid the occurrence of the circuit malfunction due to the supply of the excessively large power, and it is also possible to cut power consumption of the trial operation, so that shortage of a battery capacity at the regular operation can be suppressed.

In addition, when it is presumed that actual oil temperature $t_o$ is lower than operation assuring oil temperature t0, the malfunction determination of electric oil pump 8 is not established, so that it is possible to acquire reliability of the malfunction determination.

Figure 5:
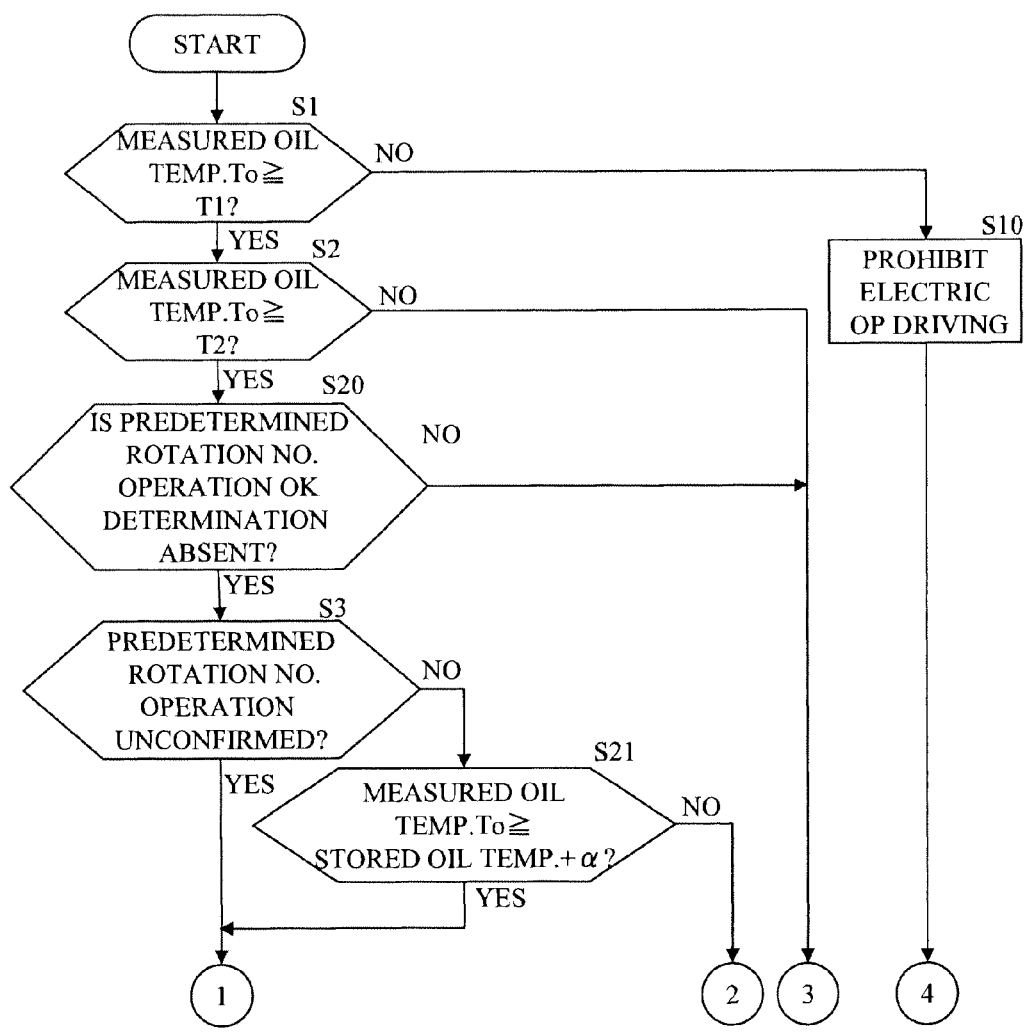
FIG. 5 is a former flowchart of power supply current control for an electric oil pump according to a second embodiment.
Figure 6:
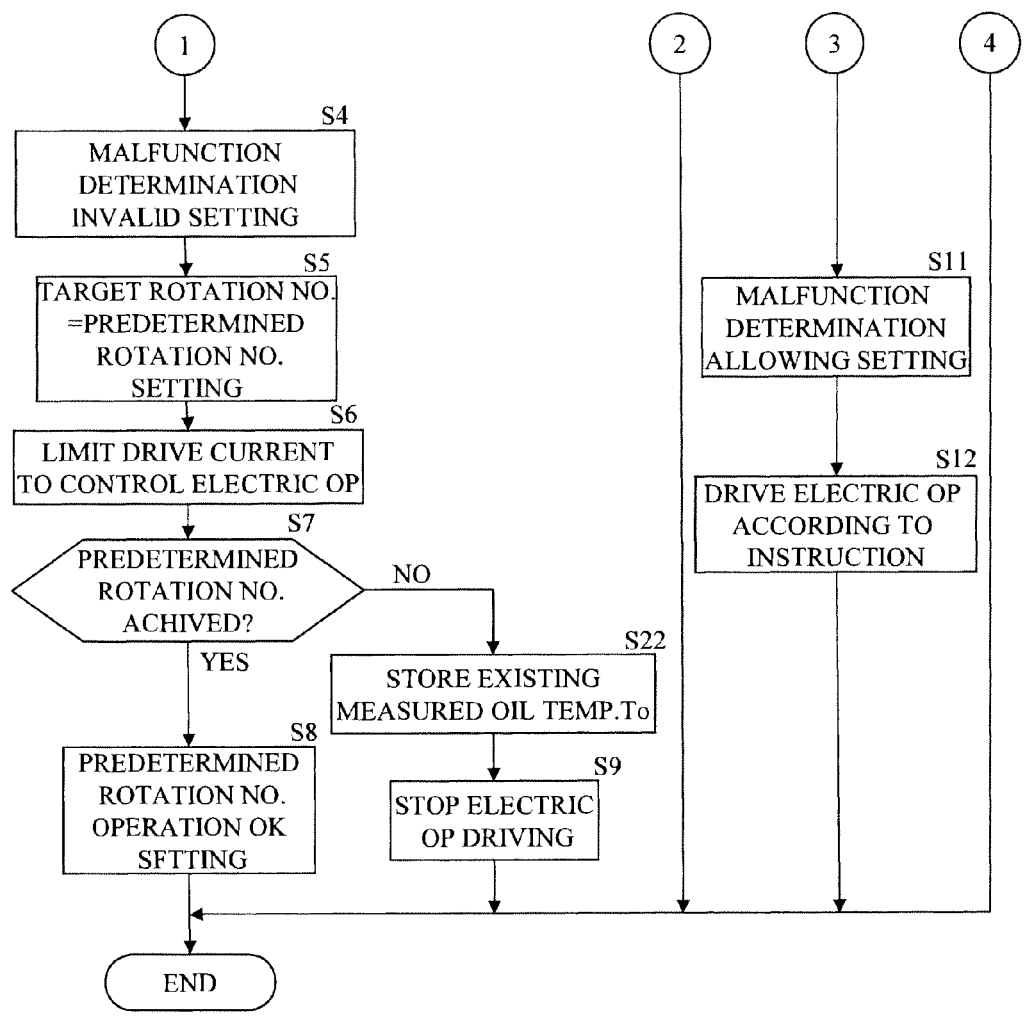
FIG. 6 is a latter flowchart of the power supply current control for the electric oil pump according to the second embodiment.

FIG. 5 and FIG. 6 illustrate a flowchart of a second embodiment.

A basic control flow is similar to the first embodiment, and hence different parts will mainly be described.

When determination of a step 2 is YES and it is determined that a measured oil temperature To is in a range of T1≤To<T2, it is determined in a step 20 whether a predetermined rotation number operation OK determination is absent.

In the first flow, predetermined rotation number operation OK setting is not absent, and hence the step proceeds to a step 3. The predetermined rotation number operation is unconfirmed, and hence the step proceeds to a step 4 or the subsequent step to drive an electric oil pump 8 while limiting a drive current and a target rotation number.

Moreover, when it is determined in a step 7 that electric oil pump 8 has reached a predetermined rotation number No, in a step 8, the predetermined rotation number operation OK setting is obtained. In the next flow, the determination of step 20 becomes NO, a malfunction determination allowing setting is obtained in a step 11, and the driving of electric oil pump 8 according to an instruction is performed in a step 12 (which is similar to the first embodiment).

On the other hand, when it is determined in step 7 that electric oil pump 8 does not reach predetermined rotation number No, measured oil temperature To is stored in a step 22, and then the driving of electric oil pump 8 is stopped in a step 9.

Furthermore, when the determination of step 3 becomes NO in the next flow, it is determined in step 21 whether new measured oil temperature To rises from the above stored measured oil temperature To (the stored oil temperature) by a predetermined value $\alpha$ or more.

When it is determined that measured oil temperature To does not rise as much as predetermined value $\alpha$ or more, the present flow ends, but when it is determined that measured oil temperature To rises as much as predetermined value $\alpha$ or more, the step proceeds to step 4 and the subsequent step to restart the limited driving of electric oil pump 8, and it is determined again whether predetermined rotation number No is achieved. According to a determination result, predetermined rotation number operation OK setting is obtained in step 8, or measured oil temperature To at the time is updated and stored in step 22.

That is, when measured oil temperature To rises as much as predetermined value $\alpha$ or more, limited electric oil pump 8 is again driven, and after predetermined rotation number No is achieved, the determination of step 20 becomes NO and the step proceeds to steps 11 and 12, to allow the malfunction determination, thereby switching to the driving of electric oil pump 8 according to the instruction.

Additionally, in a constitution where the above judgment that electric oil pump 8 is driven again is determined according to a rise rate of measured oil temperature To per unit time, when the rise rate is small, actual oil temperature $t_o$ is unlikely to rise to operation assuring oil temperature t0 or higher in a short time, and hence the stop of electric oil pump 8 may be maintained.

In the present embodiment, even when it is presumed that at the start of the trial operation, operation assuring oil temperature t0 is not reached, there is the possibility that operation assuring oil temperature t0 is reached in a short time. In this case, the trial operation is continued, and from a time point when operation assuring oil temperature t0 is presumed to be reached, the malfunction determination can be allowed, and the driving (the regular operation) of electric oil pump 8 according to a usual instruction can be started. Therefore, a function of alleviating the clutch fastening shock by electric oil pump 8 can more frequently be utilized.

Figure 7:
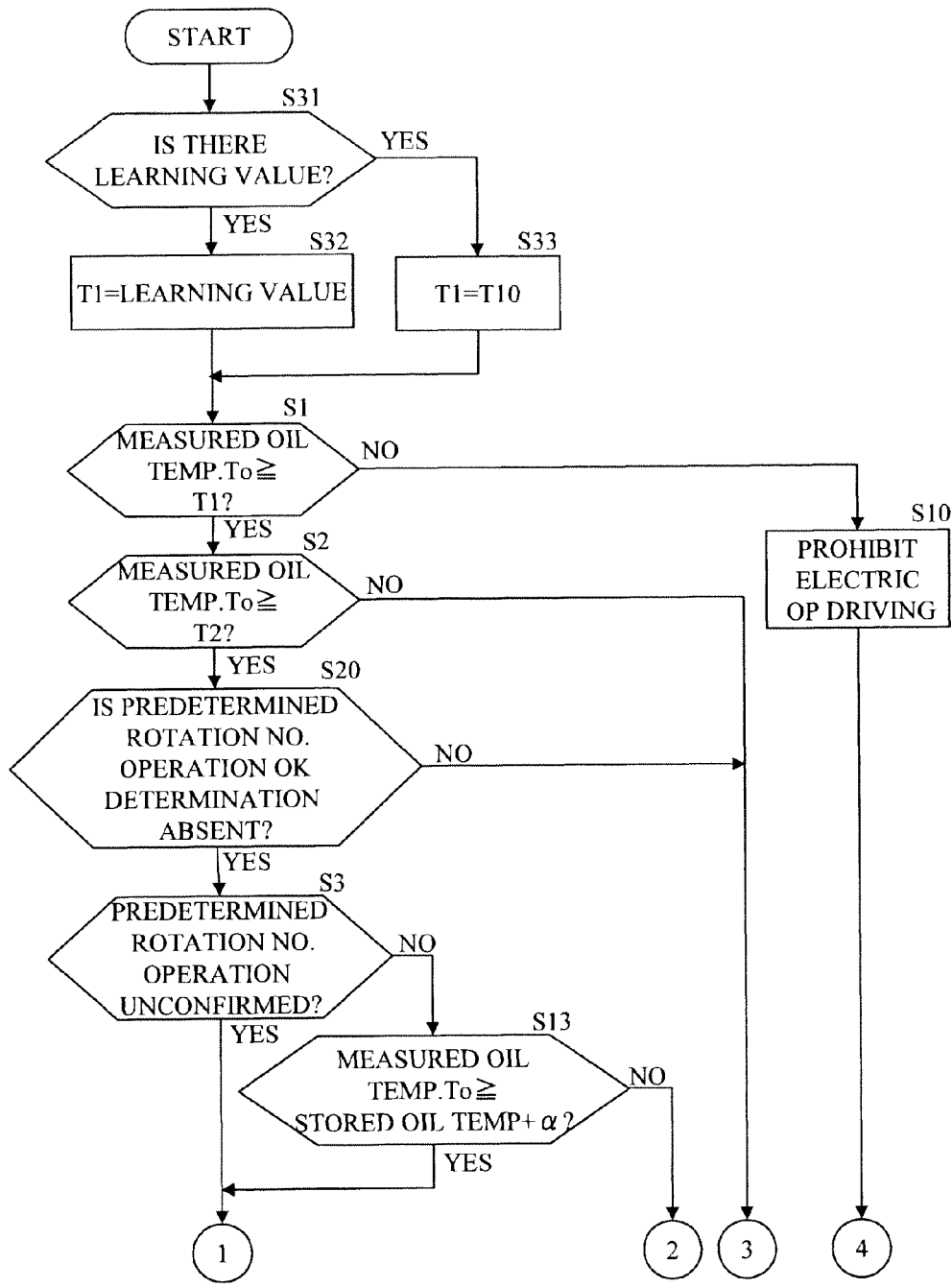
FIG. 7 is a former flowchart of power supply current control for an electric oil pump according to a third embodiment.
Figure 8:
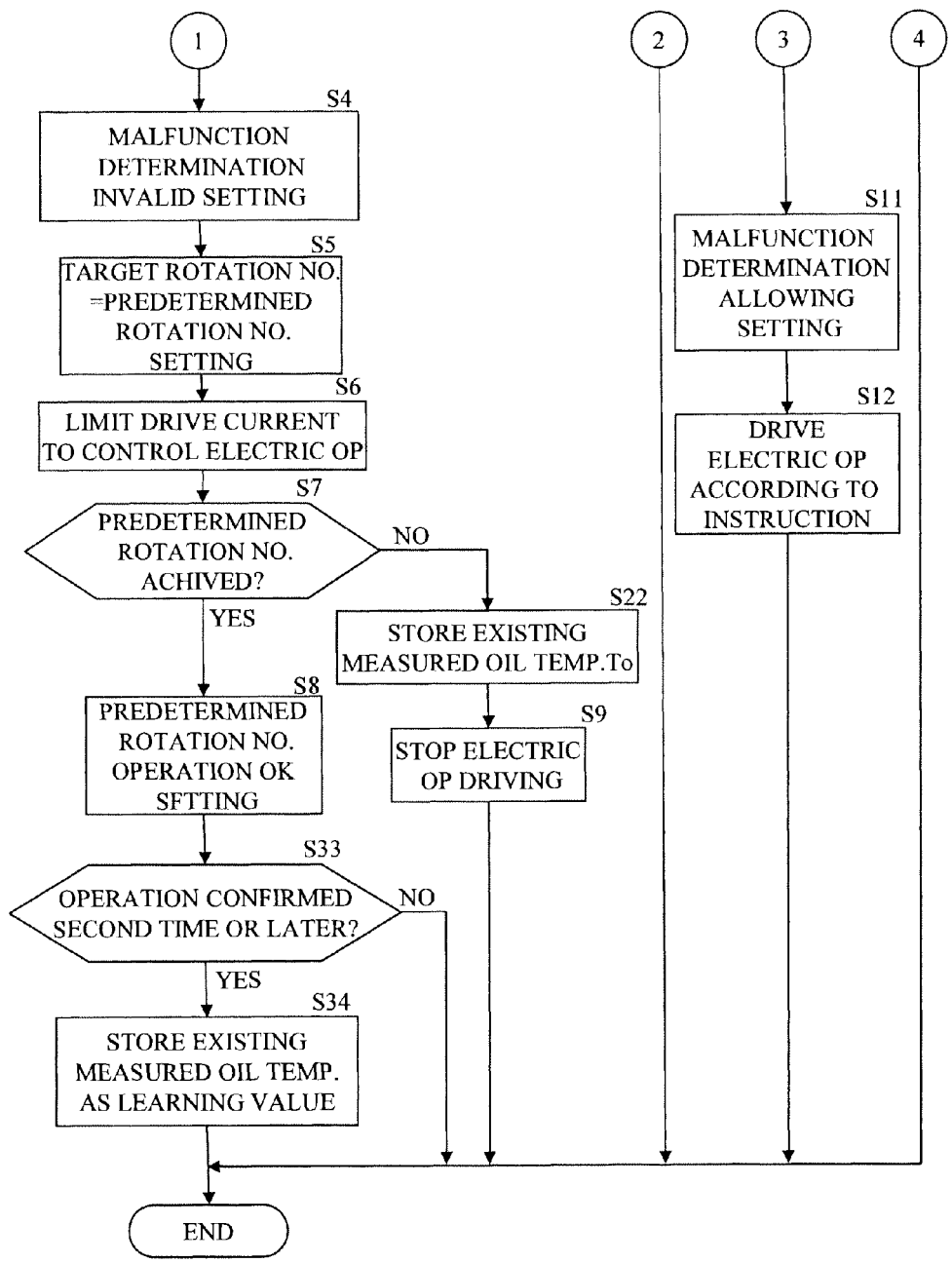
FIG. 8 is a latter flowchart of the power supply current control for the electric oil pump according to the third embodiment.

FIG. 7 and FIG. 8 illustrate a flowchart of a third embodiment. The present embodiment is obtained by adding, to the second embodiment, a function of learning a first oil temperature T1 as an operation assuring oil temperature while performing a trial operation of an electric oil pump 8. Therefore, a part added to the second embodiment will mainly be described.

In a step 31, it is determined whether there is a learning value of oil temperature learning described later (the value has been learned).

When it is determined that the learning value is present, as first oil temperature T1, the learning value is set in a step 32.

On the other hand, when it is determined that the learning value is not present, in a step 33, first oil temperature T1 is set to an initial value T10.

Next, through steps similar to those of the second embodiment, electric oil pump 8 is limited and driven, and when it is determined in the determination of a step 7 that a predetermined rotation number No operation is achieved, it is determined in a step 33 whether the predetermined rotation number No operation has been achieved at a second operation confirmation time or later.

When it is determined that the predetermined rotation number No operation is achieved at the second time or later, i.e., when predetermined rotation number No is not reached at least once and the predetermined rotation number No operation is achieved owing to an oil temperature rise later, it is presumed that a measured oil temperature To at this time reaches a lower limit temperature to assure the operation of electric oil pump 8, i.e., an oil temperature close to an operation assuring temperature. Therefore, in a step 34, existing measured oil temperature To is stored as the learning value. Additionally, it is preferable from the viewpoint of precision that the learning value is calculated by weighted averaging or filter processing in consideration of a noise phenomenon, deterioration of performance of an oil temperature sensor 83 or electric oil pump 8 with time, or the like.

After setting the learning value in this manner, in step 32, the learning value is used as first oil temperature T1.

In the present third embodiment, when first oil temperature T1 is learned as described above, it is possible to shorten the trial operation in a state where an actual oil temperature $t_o$ is low and the operation of electric oil pump 8 is not assured, and after the learning, the trial operation can substantially be eliminated, so that power consumption can be cut.

Moreover, initial value T10 of first oil temperature T1 in step 33 may be set in consideration of a fluctuation on a positive side of oil temperature sensor 83 in the same manner as in the first and second embodiments. However, in the present embodiment in which the learning is performed, the temperature may be set to a further lower limit temperature at which electric oil pump 8 operates without being impaired.

For example, when the performance of electric oil pump 8 is high, there is the possibility that the operation is assured at an oil temperature lower than the first temperature set in consideration of the fluctuation of oil temperature sensor 83. Even in this case, when the initial value of the first oil temperature is set to a temperature which is as low as possible in a range in which electric oil pump 8 is not impaired, a lower operation assuring oil temperature t0 can be found by the learning, and the function of alleviating the clutch fastening shock by electric oil pump 8 can further frequently be utilized.

Figure 9:
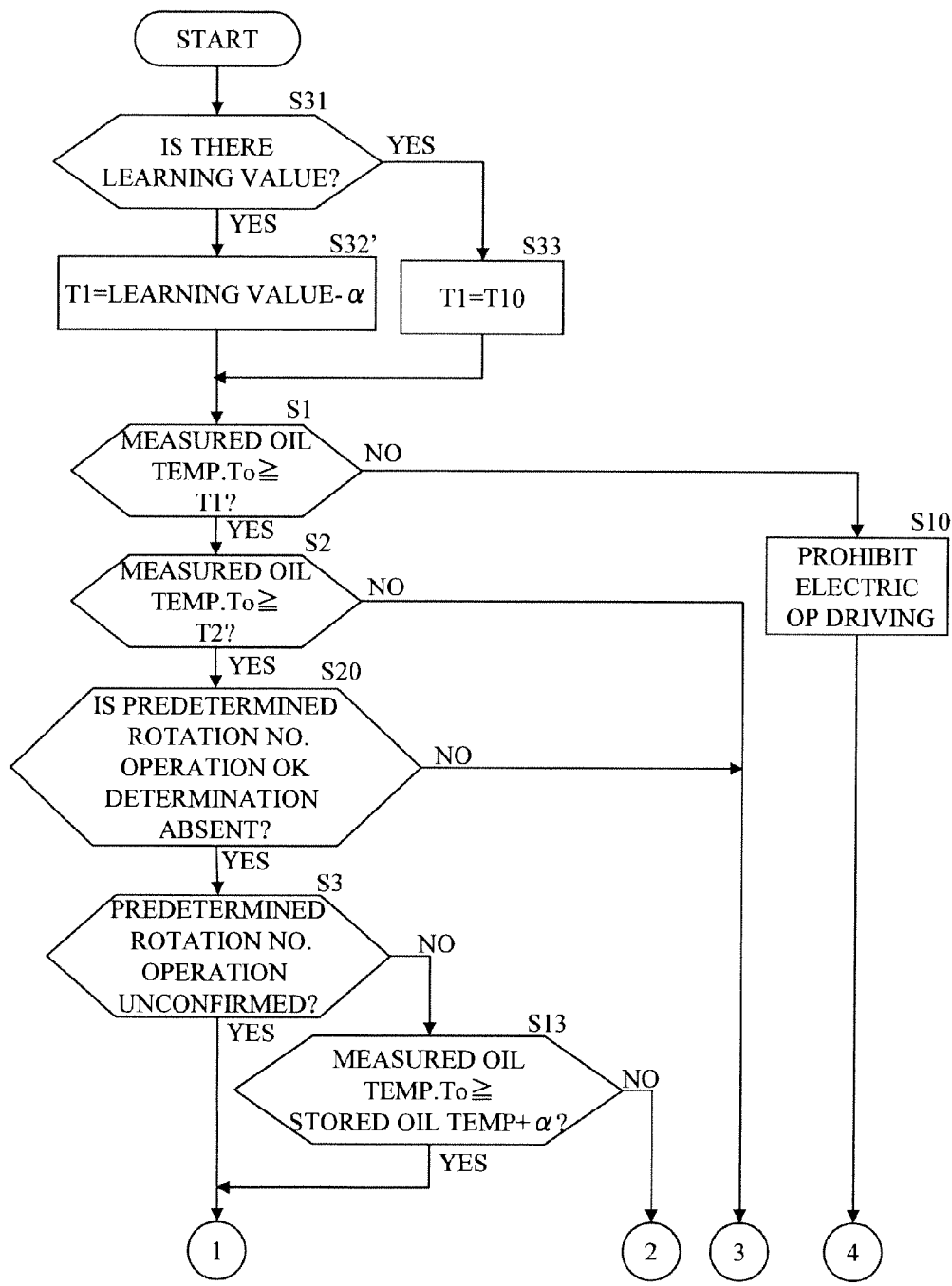
FIG. 9 is a former flowchart of power supply current control for an electric oil pump according to a fourth embodiment.
Figure 10:
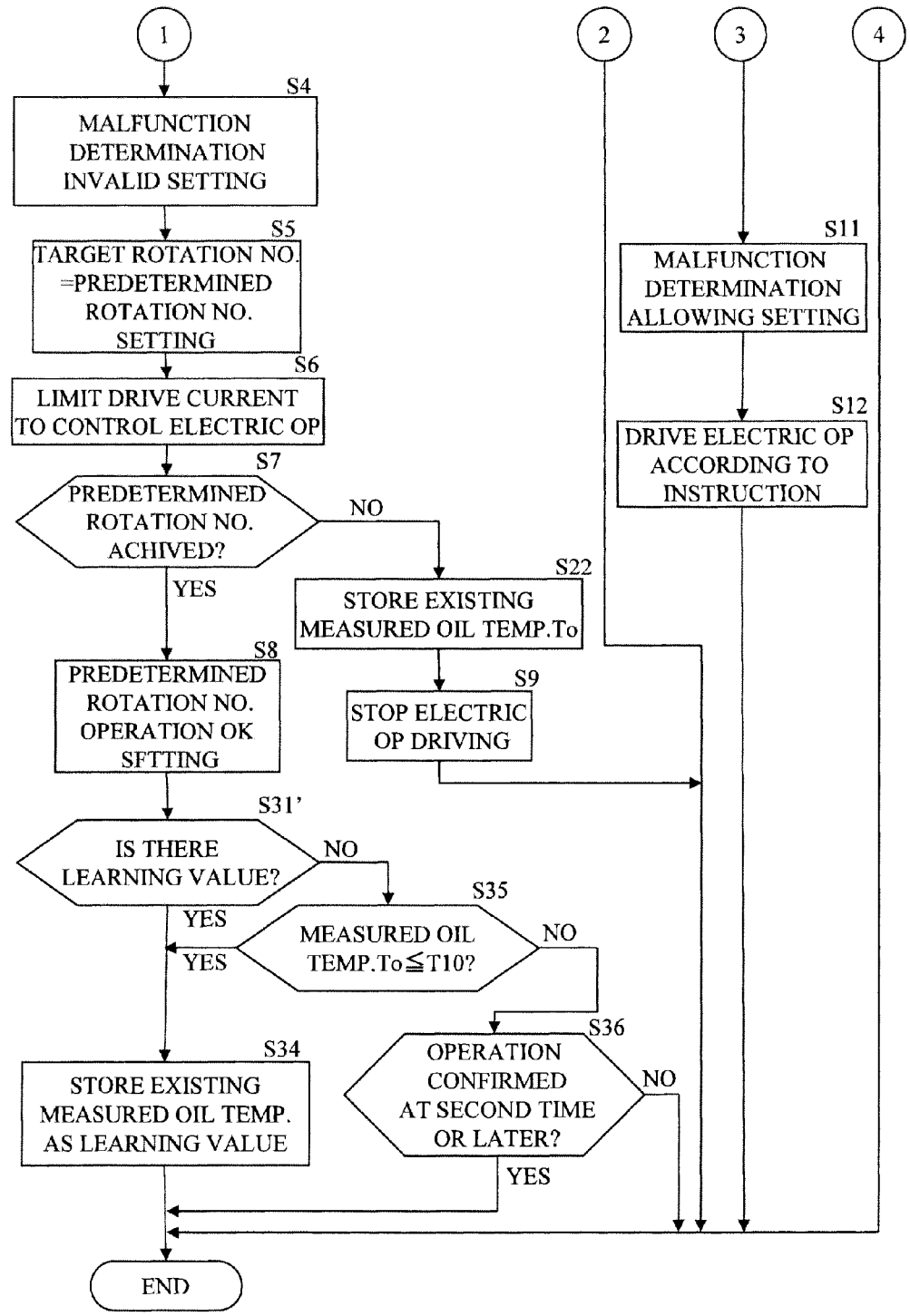
FIG. 10 is a latter flowchart of the power supply current control for the electric oil pump according to the fourth embodiment.

FIG. 9 and FIG. 10 illustrate a flowchart of a fourth embodiment. In the present embodiment, a first oil temperature T1 is learned as an operation assuring oil temperature in the same manner as in the third embodiment, but a function of gradually lowering first oil temperature T1 to learn the temperature is further added. Therefore, a part added to the third embodiment will mainly be described.

When it is determined in a step 31 that a learning value of oil temperature learning is present, the step proceeds to a step 32' to set, as first temperature T1, a value obtained by subtracting a predetermined value $\alpha$ from the learning value. Here, a reason why predetermined value $\alpha$ is subtracted will be described later.

Next, through steps similar to those of the third embodiment, an electric oil pump 8 is limited and driven, and when it is determined in the determination of a step 7 that a predetermined rotation number No operation is achieved, predetermined rotation number operation OK is set in a step 8, and then it is determined in a step 31' whether the learning is present. When it is determined that the learning value is not present, it is determined in a step 35 whether a measured oil temperature To is not higher than an initial value T10 of first temperature T1 set in a step 33.

Moreover, when it is determined that measured oil temperature To is larger than initial value T10, it is determined in a step 36 whether the predetermined rotation number No operation is achieved at a second operation confirmation time or later.

When it is determined that the predetermined rotation number No operation has been achieved at the second time or later, as described in the third embodiment, it is presumed that measured oil temperature To at this time has reached an operation assuring temperature t0, and hence existing measured oil temperature To is stored as the learning value in step 34.

On the other hand, when it is determined in step 33 that the temperature is not higher than initial value T10 of first temperature T1, in the first flow, the predetermined rotation number No operation is achieved when measured oil temperature To is initial value T10. In this case, there is the possibility that the operation of electric oil pump 8 is assured even at an oil temperature lower than initial value T10. Therefore, in a step 34, existing measured oil temperature To (=T10) is stored as the learning value, and in step 32' of the next flow, first oil temperature T1 (the learning value) is decreased to perform a trial operation again. When the trial operation is successful, learning is performed so as to update the temperature to lower operation assuring temperature t0.

Moreover, even when it is determined in step 31 that the learning value of first temperature T1 is present, the learning value is operation assuring temperature t0 confirmed by the previous operation, and the trial operation is successful with a further decreased learning value of the previous time in the present step 32'. Therefore, in step 34, existing measured oil temperature To is stored and updated as operation assuring temperature t0 learned on a lower temperature side than the previous time.

In the present fourth embodiment, as long as the trial operation is successful as described above, operation assuring temperature t0 on the lower temperature side is learned while gradually lowering first temperature T1, and operation assuring temperature t0 can be lowered until the trial operation does not become successful, so that a temperature range in which the electric oil pump can operate can be extended to the low temperature side as much as possible.

Additionally, also in the present embodiment, initial value T10 of first temperature T1 may be set in consideration of the fluctuation of an oil temperature sensor 83 on a positive side in the same manner as in the first and second embodiments, but may be set on a lower temperature side. When the lowest operation assuring temperature t0 that can be found by the learning can be presumed, the initial value T10 is set to the vicinity of the presumed value, whereby the lowest operation assuring temperature t0 can be acquired in a shorter learning time.

Next, there will be described a fifth embodiment in which the control in the above first to fourth embodiments is executed by performing intercommunication between a control circuit (feedback control unit 52 and drive circuit 82 of FIG. 2) of electric oil pump 8 and an external controller (target value calculating section 51 of FIG. 2).

In the control circuit of electric oil pump 8, an operation is performed according to a drive instruction input from the external controller.

When the operation cannot be performed according to the drive instruction, the driving of electric oil pump 8 is stopped, and an inability to operate is transmitted to the external controller.

The external controller inputs a measured oil temperature To signal from an oil temperature sensor 83 and the other pieces of vehicle information, and generates a drive instruction signal of electric oil pump 8 based on these pieces of information, to transmit the signal to electric oil pump 8.

When a signal indicating that the operation is not performed according to the drive instruction is received from the control circuit (feedback control unit 52) of electric oil pump 8, a malfunction of electric oil pump 8 is judged on an external controller side according to a vehicle state at the time.

Figure 11:
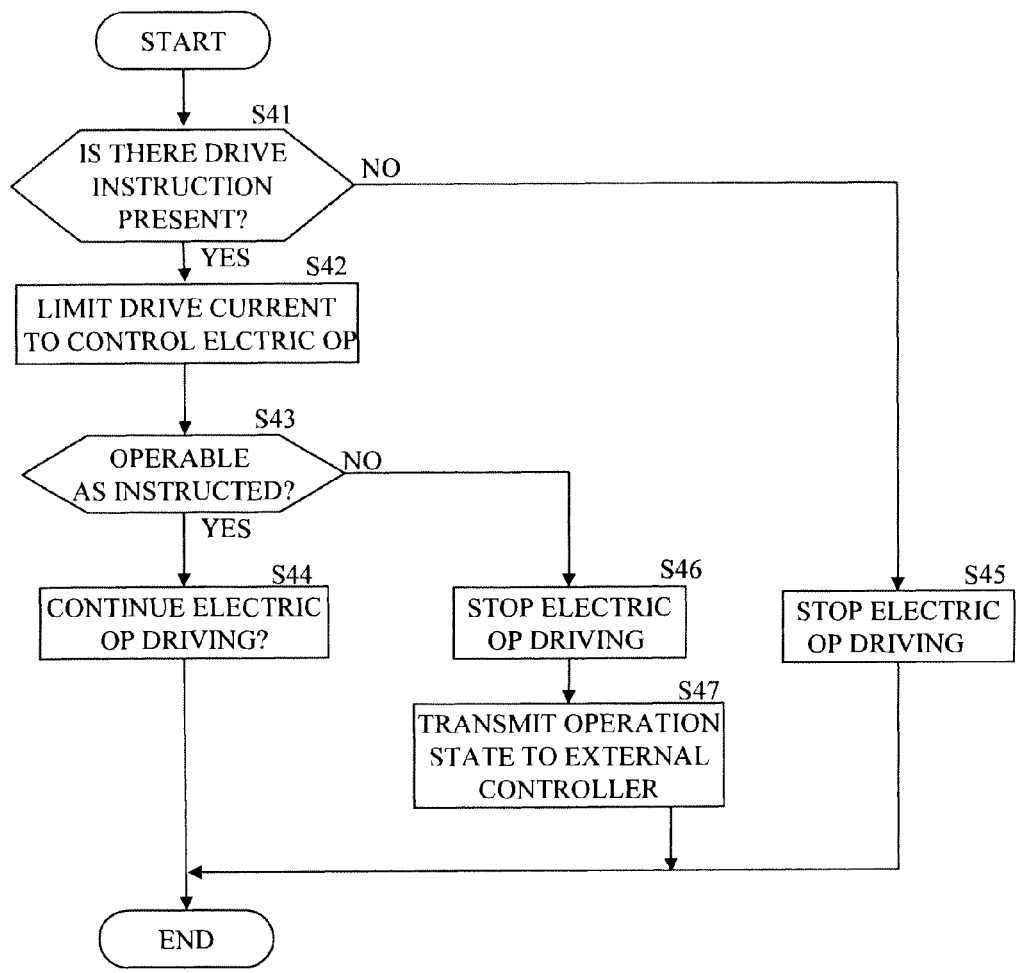
FIG. 11 is a flowchart of a drive circuit side control flow of an electric oil pump of a fifth embodiment.

FIG. 11 illustrates a control flow of the control circuit (feedback control unit 52) of electric oil pump 8 of the fifth embodiment.

In a step 41, it is determined whether or not the drive instruction of electric oil pump 8 (including an instruction for a trial operation) is present, and when there is not any instruction, in a step 45, the driving of electric oil pump 8 is stopped in a step 45.

When it is determined that the drive instruction is present, in a step 42, electric oil pump 8 is controlled while limiting the drive current according to the drive instruction (the control of the trial operation has a stricter limit than the usual control).

The drive instruction is, for example, a pump (motor) rotation number [predetermined rotation number No at the trial operation, and the target rotation number set according to a vehicle state at usual control (the regular operation) after the completion of the trial operation], and hence a current is controlled by any one of the following systems.

a. A current value is set in proportion to the instructed pump rotation number (including the trial operation).

b. The current value is switched to two higher and lower stages and set, when the pump rotation number instructed at the regular operation is not smaller than a set rotation number No1 (>No) and when the rotation number is smaller than set rotation number No1.

c. The current value is limited when the instructed number is predetermined rotation number No at the trial operation, and the limiting of the current value is eliminated when a rotation number which is larger than predetermined rotation number No is instructed.

d. The value is constantly limited to a predetermined current value irrespective of the trial operation or the regular operation.

In a step 43, it is determined whether or not electric oil pump 8 can be operated as instructed.

When the operation is possible according to the instruction, in a step 44, the driving of electric oil pump 8 is continued.

When electric oil pump 8 cannot be operated as instructed (the rotation numbers including the predetermined rotation number at the trial operation do not reach the target rotation number), the driving of electric oil pump 8 is stopped in a step 46, and the operation state (the inability to operate) is transmitted to the external controller in a step 47.

Figure 12:
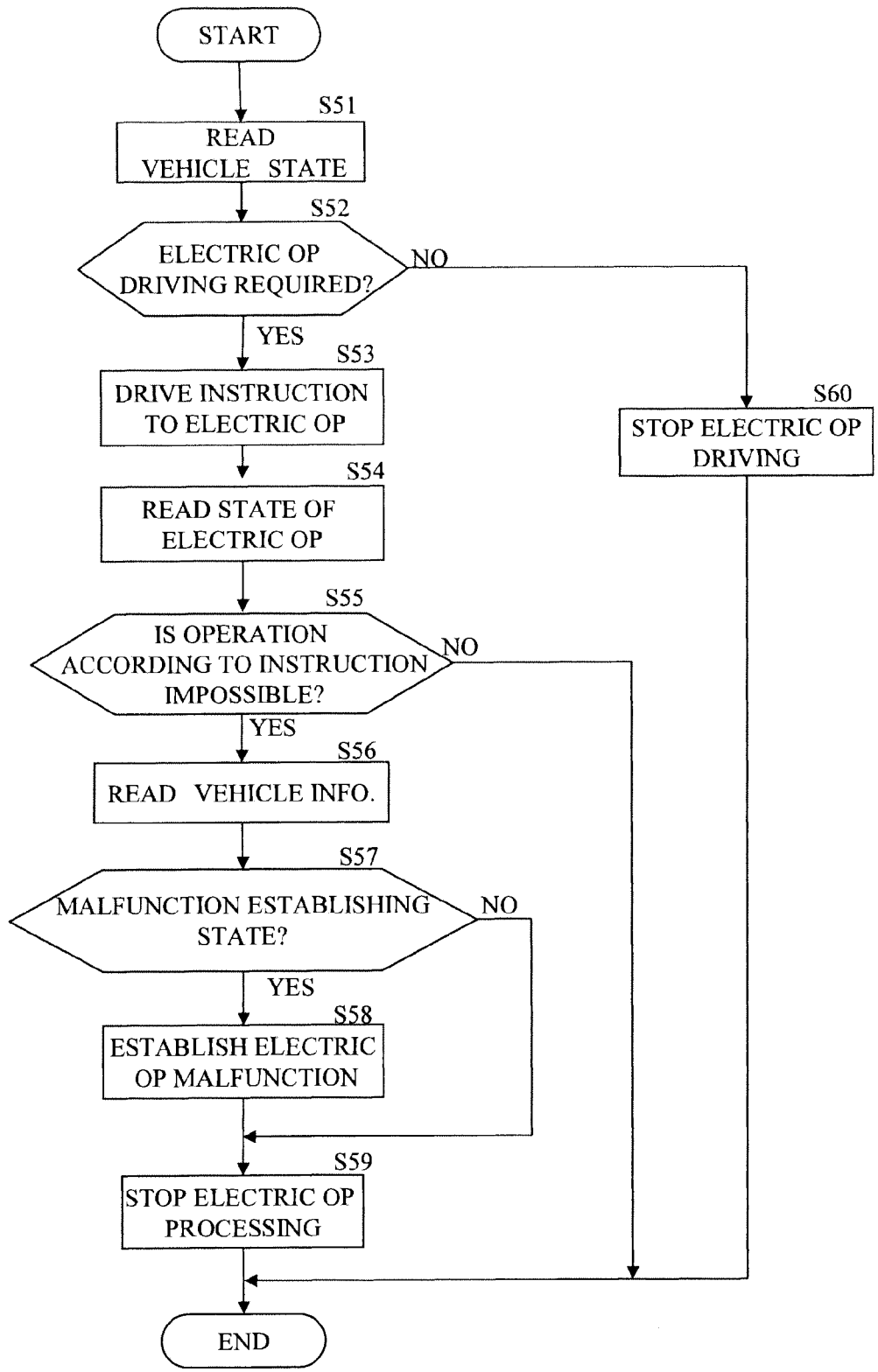
FIG. 12 is a flowchart of an external controller side control flow of the fifth embodiment.

FIG. 12 illustrates a control flow on the external controller side of the fifth embodiment.

In a step 51, the vehicle information including measured oil temperature To is read.

In a step 52, it is determined whether or not the driving of electric oil pump 8 is required.

When it is determined that the driving is not required, in a step 60, the driving stop of electric oil pump 8 is instructed. Consequently, in the drive circuit of electric oil pump 8, the determination of step 41 becomes NO, to stop the driving.

When it is determined that the driving is required, a drive instruction is output to the drive circuit of electric oil pump 8 in a step 53. For example, there is instructed the driving of feedback control to use the predetermined rotation number at the trial operation, and use the target rotation number set according to the vehicle state at the usual control after the completion of the trial operation.

In a step 54, the operation state of electric oil pump 8 input from a drive circuit side is read.

In a step 55, it is determined whether or not the operation according to the instruction is impossible (whether an operation defect state in step 47 is input from the drive circuit side of electric oil pump 8).

When it is not determined that the operation according to the instruction is impossible, the present state is maintained, but when it is determined that the operation according to the instruction is impossible, the vehicle information is read in a step 56.

In a step 57, it is determined based on the vehicle information whether or not there is a state where the malfunction of electric oil pump 8 can be established. For example, the oil temperature is not lower than an operation assuring oil temperature t0, additionally, a battery voltage is not lower than a predetermined value, and a drive circuit of an oil temperature sensor 83 or the like has been diagnosed to be normal. When the operation of electric oil pump 8 is normal in this way, it is determined that there is a state where the operation can be performed according to the drive instruction, and when the operation cannot be performed according to the drive instruction, it is determined that there is the state where the malfunction of electric oil pump 8 is established.

Thus, when it is determined that there is the state where the malfunction is established, in a step 58, the malfunction of electric oil pump 8 is established, and then the step proceeds to a step 59 to perform driving stop processing of electric oil pump 8 (when the pump already stops, the stop is maintained).

On the other hand, in a state where the trial operation is not completed (the state where it is not confirmed that the predetermined rotation number is reached), the malfunction cannot be established, and hence the step proceeds to a step 59 without establishing the malfunction, to perform the driving stop processing of electric oil pump 8.

Here, in a constitution where a signal from oil temperature sensor 83 is input to perform the malfunction determination according to the oil temperature in the drive circuit of electric oil pump 8, a load of a microcomputer increases. Moreover, for example, it is necessary to add a harness from oil temperature sensor 83 to the drive circuit, which results in cost increase.

In contrast, the external controller originally inputs oil temperature information for generating the drive instruction signal, and hence when the malfunction determination is also performed according to the oil temperature as in the present embodiment, the microcomputer load of the drive circuit can be alleviated, and the harness does not have to be added, which is also advantageous for the cost.

Figure 13:
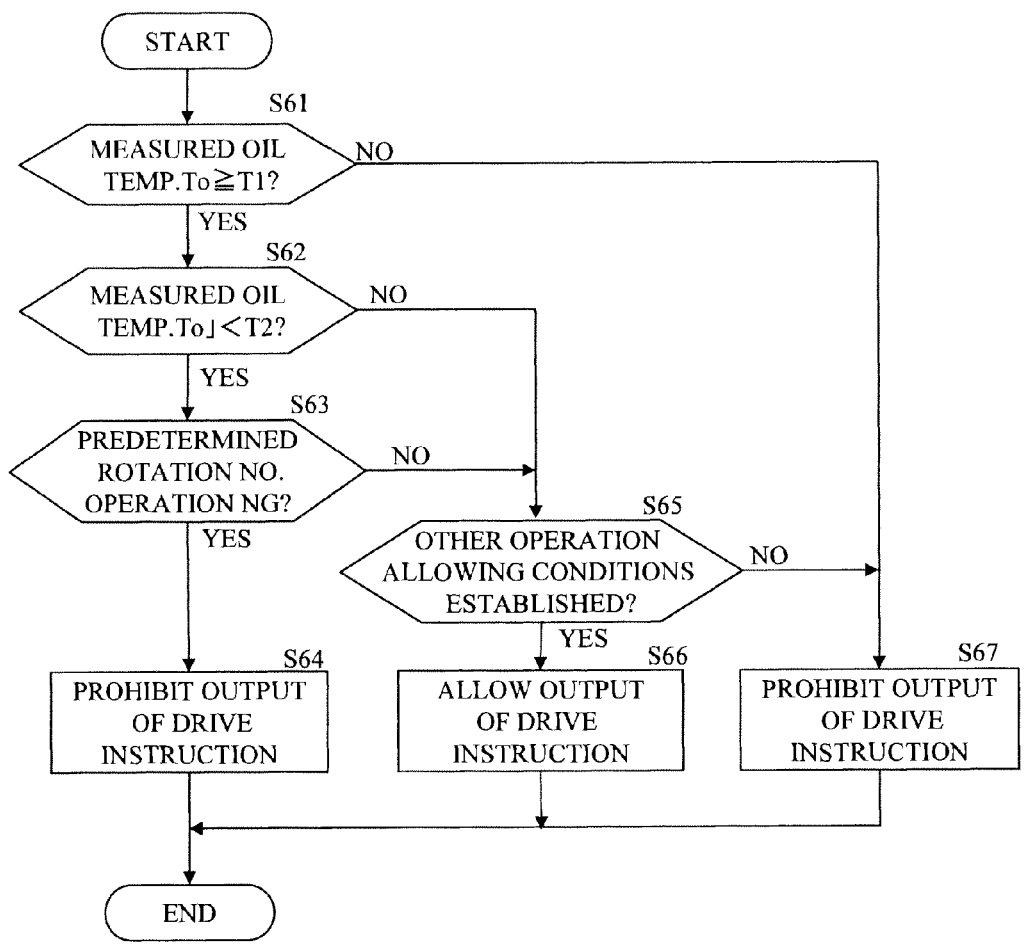
FIG. 13 is a flowchart of a sixth embodiment of a flow of drive allowing determination of the electric oil pump.

FIG. 13 is a flowchart of the sixth embodiment illustrating a flow of allowing determination of the driving of electric oil pump 8 according to the instruction in step 12 in the control of the above first to fourth embodiments.

In a step 61, it is determined whether measured oil temperature To is not lower than first temperature T1. When it is determined that the temperature is lower than first oil temperature T1, the operation of electric oil pump 8 is not assured, and hence in a step 67, the output of the drive instruction to electric oil pump 8 is prohibited. Additionally, first oil temperature T1 is the oil temperature set in consideration of the fluctuation of oil temperature sensor 83 in the first and second embodiments, the learning value or the function assuring lower limit temperature of electric oil pump 8 prior to the learning in the third embodiment, and the learning value—α or the temperature set to be lower than the oil temperature set in consideration of the fluctuation in the fourth embodiment.

When it is determined that measured oil temperature To is not lower than first oil temperature T1, it is determined in a step 62 whether or not measured oil temperature To is lower than second oil temperature T2.

When it is determined that measured oil temperature To is not lower than second oil temperature T2, the operation of electric oil pump 8 is assured at the oil temperature, and hence the step proceeds to a step 65 to determine whether or not the other operation allowing conditions (e.g., the malfunction diagnosis result of the battery voltage or the other drive current is normal) are established.

Moreover, when it is determined in step 65 that the other operation allowing conditions are also established, the output of the drive instruction to electric oil pump 8 is allowed in a step 66. When the other operation allowing conditions are not established, the output of the drive instruction to electric oil pump 8 is prohibited in step 67.

Furthermore, when it is determined in step 62 that measured oil temperature To is lower than second oil temperature T2, it is determined in a step 63 whether or not the predetermined rotation number operation is NG (the predetermined rotation number is not reached at the trial operation).

In addition, when it is determined that the predetermined rotation number operation is NG, the output of the drive instruction to electric oil pump 8 is prohibited in a step 64, and when it is determined that the predetermined rotation number operation is OK, the step proceeds step 65. When the other operation allowing conditions are established, the output of the drive instruction to electric oil pump 8 is allowed in step 66, and when the conditions are not established, the output of the drive instruction to electric oil pump 8 is prohibited in step 67.

In this case, when reliability of the normal operation of electric oil pump 8 according to the instruction is high, the drive instruction output is allowed, and hence the wasting of power consumption of electric oil pump 8 can be saved.

On the other hand, when the reliability of the normal operation is low, the drive instruction output is prohibited, and hence the deterioration of durability of electric oil pump 8 due to the supply of the excessive current can be suppressed.

In the above embodiments, it has been described that the present invention is applied to the control apparatus of the electric oil pump for generating the hydraulic pressure of the transmission of the idle stop car, but the present invention can similarly be applied to a control apparatus of an electric oil pump for use in cooling a running electric motor or an inverter of a hybrid car, or the like, and a similar effect can be obtained.

The entire contents of Japanese Patent Application NO. 2011-206739 filed Sep. 22, 2011 is incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. A control apparatus of an electric oil pump which supplies oil to a vehicle drive system, comprising: an oil temperature measuring section which measures an oil temperature; a trial operation control section which performs a trial operation in a state in which a drive current of the electric oil pump is limited to be less than a required drive current of the electric oil pump, and performs the trial operation in a state in which the trial operation control section does not establish a malfunction determination of the electric oil pump when the measured oil temperature is in a temperature range in which operation of the electric oil pump is susceptible to measurement error due to a fluctuation of the oil temperature measuring section; and a regular operation allowing determining section which allows a regular operation of the electric oil pump while allowing the malfunction determination of a main body of the electric oil pump when a rotation number increasing state of the electric oil pump subjected to the trial operation satisfies a regular operation allowing condition, and which stops driving of the electric oil pump when the rotation number increasing state does not satisfy the regular operation allowing condition.

2. The control apparatus of the electric oil pump according to claim 1, further comprising:
   a first pump control section which drives the electric oil pump according to a request, when the oil temperature measured after turning on a drive power supply is not lower than a second temperature; and
   a second pump control section which does not allow the driving of the electric oil pump, when the measured oil temperature is lower than a first temperature that is lower than the second temperature,
   wherein the trial operation control section forcibly drives the electric oil pump while limiting a drive current by use of a limited predetermined rotation number as a target value irrespective of whether the pump operation is requested in the state in which the malfunction determination of the electric oil pump is not established, when the measured oil temperature is not lower than the first temperature and is lower than the second temperature, and
   the regular operation allowing determining section stops the driving of the electric oil pump, when the predetermined rotation number cannot be reached by the forcible driving, and allows the malfunction determination of a main body of the electric oil pump and drives the electric oil pump according to the request, when the predetermined rotation number is reachable.

3. The control apparatus of the electric oil pump according to claim 2,
   wherein the regular operation allowing determining section forcibly drives the electric oil pump again while limiting a drive current by use of the predetermined rotation number as the target value so as to judge whether or not the predetermined rotation number is reached when the measured oil temperature rises to a temperature which is higher than the first temperature by a predetermined temperature, in a case in which the predetermined rotation number cannot be reached and the driving of the electric oil pump is stopped,
   wherein the predetermined temperature is lower than the second temperature.

4. The control apparatus of the electric oil pump according to claim 3,
   wherein the regular operation allowing determining section allows the malfunction determination of the main body of the electric oil pump, and drives the electric oil pump according to the request, when the measured oil temperature reaches the second temperature in a case in which the predetermined rotation number cannot be reached and the driving of the electric oil pump is stopped.

5. The control apparatus of the electric oil pump according to claim 2, further comprising:
   a learning control section which forcibly drives the electric oil pump while limiting a drive current by use of the predetermined rotation number as a target value, stores the oil temperature measured at the time as a learning value when the predetermined rotation number is reached, and controls a start of the electric oil pump based on the learning value of the oil temperature.

6. The control apparatus of the electric oil pump according to claim 1,
   wherein a drive instruction of the electric oil pump is performed by an external controller, and the electric oil pump operates according to the drive instruction,
   wherein the control apparatus further comprises:
      a determining section which determines whether or not the operation of the electric oil pump is possible according to the drive instruction;
      a judgment transmitting section which operates the electric oil pump according to the drive instruction when the determining section determines that the operation is possible, stops the operation of the electric oil pump without performing the malfunction determination when the determining section determines that the operation is not possible, and transmits judgment of an inability to operate to the external controller; and
      a malfunction judging section which judges the malfunction of the electric oil pump based on at least oil temperature information in the external controller.

7. The control apparatus of the electric oil pump according to claim 1,
   wherein the electric oil pump is configured to generate a hydraulic pressure of a transmission of an idle stop car.

8. The control apparatus of the electric oil pump according to claim 1,
   wherein the electric oil pump is configured to cool a running electric motor or an inverter of a hybrid car.

9. A control apparatus of an electric oil pump which supplies oil to a vehicle drive system, comprising: oil temperature measuring means for measuring an oil temperature: trial operation control means for performing a trial operation in a state in which a drive current of the electric oil pump is limited to be less than a required drive current of the electric oil pump and in a state where the trial operation control means does not establish a malfunction determination of the electric oil pump when the measured oil temperature is in a temperature range in which operation of the electric oil pump is susceptible to measurement error due to a fluctuation of the oil temperature measuring means; and regular operation allowing determining means for allowing a regular operation of the electric oil pump while allowing the malfunction determination of a main body of the electric oil pump when a rotation number increasing state of the electric oil pump subjected to the trial operation satisfies a regular operation allowing condition, and for stopping driving of the electric oil pump when the rotation number increasing state does not satisfy the regular operation allowing condition.

* * * * *